(12) United States Patent
Yue et al.

(10) Patent No.: US 8,774,045 B2
(45) Date of Patent: Jul. 8, 2014

(54) PACKET LOSS DETECTING METHOD AND APPARATUS, AND ROUTER

(75) Inventors: Jianfei Yue, Nanjing (CN); Huihua Song, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 13/536,031

(22) Filed: Jun. 28, 2012

(65) Prior Publication Data

US 2012/0269086 A1 Oct. 25, 2012

Related U.S. Application Data

(63) Continuation of application No. PCT/CN2010/079641, filed on Dec. 10, 2010.

(30) Foreign Application Priority Data

Dec. 30, 2009 (CN) .......................... 2009 1 0258932

(51) Int. Cl.
*H04L 12/26* (2006.01)
*H04L 1/20* (2006.01)
*H04L 12/56* (2006.01)

(52) U.S. Cl.
CPC ............ *H04L 43/0829* (2013.01); *H04L 1/203* (2013.01); *H04L 45/308* (2013.01)
USPC .......................................... 370/252; 370/253

(58) Field of Classification Search
CPC ... H04W 24/00; H04L 43/50; H04L 43/0852; H04L 43/08; H04B 17/003
USPC .................. 370/201, 202, 252, 253
See application file for complete search history.

(56) References Cited

U.S. PATENT DOCUMENTS 7,843,843 B1 * 11/2010 Papp et al. ..................... 370/252
2003/0115321 A1 6/2003 Edmison et al.

(Continued)

FOREIGN PATENT DOCUMENTS

| CN | 1933431 | 3/2007 |
|---|---|---|
| CN | 101605020 | 12/2009 |

(Continued)

OTHER PUBLICATIONS

European Patent Office Communication related to Application No. 10840491.4-1249, regarding the extended European search report, pursuant to Rule 62 EPC, the supplementary European search report (Art. 153(7) EPC) and the European search opinion; (6 pgs.) dated Aug. 20, 2012.

(Continued)

*Primary Examiner* — Hassan Phillips
*Assistant Examiner* — Siren Wei
(74) *Attorney, Agent, or Firm* — Slater & Matsil, L.L.P.

(57) ABSTRACT

A packet loss detecting method includes: a first router counts received packets and sent packets respectively according to a class of service value of a packet in each tunnel; the first router generates a first packet loss detection packet corresponding to the class of service value, sends the first packet loss detection packet to a second router at a peer end, and receives a first packet loss response packet returned by the second router; and the first router corresponds a class of service value, and measures a packet loss value according to a locally recorded count value and a count value carried in the first packet loss response packet. With the technical solution, packet disorder does not occur when packet loss measurement is performed for a pseudo-wire with multiple classes of service. In addition, traffic detection occupies a smaller bandwidth.

3 Claims, 4 Drawing Sheets

(56) References Cited

U.S. PATENT DOCUMENTS

| | | |
|---|---|---|
| 2006/0285500 A1* | 12/2006 | Booth et al. ............... 370/250 |
| 2007/0274229 A1 | 11/2007 | Scholl et al. |
| 2008/0080390 A1* | 4/2008 | Ebuchi et al. ............... 370/253 |
| 2009/0016233 A1 | 1/2009 | Lu |
| 2010/0302949 A1 | 12/2010 | Fukagawa |

FOREIGN PATENT DOCUMENTS

| | | |
|---|---|---|
| CN | 101616037 | 12/2009 |
| WO | 2009098757 A1 | 8/2009 |

OTHER PUBLICATIONS

Japanese Office Action received in Application No. 2012-546329 mailed Sep. 10, 2013, 5 pages.

First Chinese Office Action of Chinese Application No. 200910258932.5 mailed Nov. 28, 2012, 8 pages (Partial Translation).

Second Office Action of Chinese Application No. 200910258932.5 mailed May 16, 2013, 12 pages. (Partial Translation).

PCT International Search Report mailed Mar. 17, 2011, issued in related International Application No. PCT/CN2010/079641, Huawei Technologies Co., Ltd. (4 pages).

PCT Written Opinion of the International Searching Authority mailed Mar. 17, 2011, issued in related International Application No. PCT/CN2010/079641, Huawei Technologies Co., Ltd. (4 pages).

International Telecommunication Union, ITU-T, Y.1731, "Series Y: Global Information Infrastructure, Internet Protocol Aspects and Next-Generation Networks", OAM Functions and Mechanisms for Ethernet Based Networks, Feb. 2008 (82 pages).

International Telecommunication Union, COM 12—LS xxx—E, Liaison Statement—Comments on Y.1731 PM, Dec. 9-11, 2008 (3 pages).

* cited by examiner

PACKET LOSS DETECTING METHOD AND APPARATUS, AND ROUTER

CROSS-REFERENCE TO RELATED APPLICATIONS

This disclosure is a continuation of International Application No. PCT/CN2010/079641, filed on Dec. 10, 2010, which claims priority to Chinese Patent Application No. 200910258932.5, filed on Dec. 30, 2009, both of which are hereby incorporated by reference in their entireties.

FIELD OF THE DISCLOSURE

The embodiments of the present disclosure relate to a communication technology, and in particular, to a packet loss detecting method and apparatus, and a router.

BACKGROUND OF THE DISCLOSURE

Originally, the Ethernet is mainly applied to a local area network (Local Area Network, referred to as LAN) environment, and operations, administration and maintenance (Operations, Administration and Maintenance, referred to as OAM) capability is weaker. At present, only a management system at a network element level is available. A management tool of the management system is not enough to support network management that is required by a public telecommunication network. After an Ethernet technology is applied in a metropolitan area network, a demand for an OAM function is increasingly concerned. The International Telecommunication Union (International Telecommunication Union, referred to as ITU) proposes the Y.1731 protocol to solve an OAM problem of the Ethernet. OAM is mainly divided into fault management and performance management, where an important part of the performance management is packet loss detection.

The Y.1731 protocol mainly proposes two measurement modes for packet loss detection: dual-ended lost-measure (dual-ended lost-measure) and single-ended lost-measure (single-ended lost-measure). The dual-ended lost-measure and the single-ended lost-measure are generally preformed between two routers that are connected through an intermediate device. Principles of the two modes of packet loss detection are similar. A first router that initiates packet loss detection needs to send a packet loss detection packet to a second router at a peer end. The second router at the peer end returns a count value of received packets and a count value of sent packets, where the count value of received packets and the count value of sent packets are locally recorded, so that at some time point, the first router that initiates packet loss detection may not only obtain a count value of received packets and a count value of sent packets, where the count value of received packets and the count value of sent packets are locally recorded, but also know the count value of received packets and the count value of sent packets of the second router. Subsequently, at a next time point, the first router initiates packet loss detection again. By calculating a difference between respective four count values at the two time points according to a preset formula, the number of lost packets may be measured.

During implementation of the present disclosure, however, the inventor finds that the prior art has at least the following problems: A packet transmitted in a virtual private network (Virtual Private Network, referred to as VPN), such as a virtual private local area network service (Virtual Private LAN Service, referred to as VPLS) or a virtual leased line (Virtual Leased Line, referred to as VLL), is transmitted over a pseudo-wire (Pseudo-Wire, referred to as PW), and the PW may also be known as a pseudo circuit or a tunnel. Multiple PWs may exist in a VPN at the same time. Each PW may carry packets of multiple types of service flows at the same time. A service flow corresponding to a packet transmitted in a PW has different classes of service (Class of Service, referred to as CoS), that is, has different scheduling priorities for sending. A certain CoS value should also be set for a packet loss detection packet. When the preceding packet loss detection solution is implemented for a packet in a PW, disorder occurs no matter which CoS value is set for the packet loss detection packet. If a largest CoS value is set for the packet loss detection packet, when the packet loss detection packet is sent after packets of other service flows are sent, an intermediate device sends the packet loss detection packet preferentially because the packet loss detection packet has a higher priority. In this way, the packet loss detection packet arrives at a router at a peer end before other packets. As a result, a count value of received packets, obtained by the router at the peer end at this time, does not include a packet that arrives subsequently. On the contrary, if a CoS value of the packet loss detection packet is set to a low priority, the packet loss detection packet is sent by the intermediate device after other packets are sent. As a result, a count value of received packets, obtained by the router at the peer end, includes a packet that arrives previously. In preceding cases, measurement results are both not accurate.

In the prior art, an in-line real time flow monitoring (In-Line Real-time Flow Monitoring, referred to as IRSM) detection solution is further provided. IRSM detection is detection based on a service flow. In this detection solution, a service packet is duplicated for each service flow, and the service packet carries a count value of received and sent packets. This technical solution is based on a service flow, however, is not applicable to a situation where packet loss is detected in a PW. Generally, a PW carries thousands of service flows. In the IRSM detection solution, one IRSM detection flow needs to be deployed for each service flow, resulting in a huge waste of a PW bandwidth.

SUMMARY OF THE DISCLOSURE

Packet loss detecting method and apparatus, and a router are provided in embodiments of the present disclosure, so as to improve accuracy of packet loss detection.

A packet loss detecting method is provided in an embodiment of the present disclosure, including:

counting, by a first router, received packets and sent packets respectively according to a class of service value of a packet in each tunnel;

generating, by the first router, a first packet loss detection packet corresponding to the class of service value, sending the first packet loss detection packet to a second router at a peer end, and receiving a first packet loss response packet returned by the second router; and corresponding, by the first router, to a class of service value, and measuring a packet loss value according to a locally recorded count value and a count value carried in the first packet loss response packet.

A packet loss detecting apparatus is provided in an embodiment of the present disclosure, including:

a counting module, configured to: count received packets and sent packets respectively according to a class of service value of a packet in each tunnel;

a packet loss detecting module, configured to: generate a first packet loss detection packet corresponding to the class of service value; send the first packet loss detection packet to a second router at a peer end; and receive a first packet loss response packet returned by the second router; and a packet loss measuring module, configured to correspond a class of service value, and measure a packet loss value according to a count value locally recorded and a count value carried in the first packet loss response packet.

A router is further provided in an embodiment of the present disclosure, and includes the packet loss detecting apparatus in the present disclosure. The router is interconnected with another router that is the same as the router provided in the embodiment through a tunnel.

With the technical solution in each embodiment of the present disclosure, taking only a PW as a detection object is extended to taking a PW and a CoS value as detection objects, which may solve a problem that packet disorder occurs when packet loss measurement is performed for a PW with multiple CoS values, causing that a packet loss measurement result is not accurate. With the technical solutions in the embodiments of the present disclosure, packet loss detection is simultaneously performed on service flow packets that have the same CoS value in each PW. Measurement flows, the number of which is corresponding to the number of the CoS values, need to be deployed in a PW at most, so that packet loss detection for all traffic in the PW may be implemented by occupying only a small PW bandwidth. Therefore, the following advantages also exist: Traffic detection occupies a smaller bandwidth, the amount of configuration is low, and interconnection is not affected.

BRIEF DESCRIPTION OF THE DRAWINGS

To describe the technical solutions in the embodiments of the present disclosure or in the prior art more clearly, the accompanying drawings required for describing the embodiments or the prior art are introduced briefly in the following. Apparently, the accompanying drawings in the following description are merely some embodiments of the present disclosure, and those skilled in the art may also obtain other drawings according to these accompanying, drawings without creative efforts.

DETAILED DESCRIPTION OF THE EMBODIMENTS

To make the objectives, technical solutions, and advantages of the embodiments of the present disclosure clearer, the technical solutions in the embodiments of the present disclosure are described clearly and completely in the following with reference to the accompanying drawings in the embodiments of the present disclosure. Apparently, the embodiments to be described are only a part rather than all of the embodiments of the present disclosure. Based on the embodiments of the present disclosure, all other embodiments obtained by those skilled in the art without creative efforts shall fall within the protection scope of the present disclosure.

Embodiment 1

Figure 1:
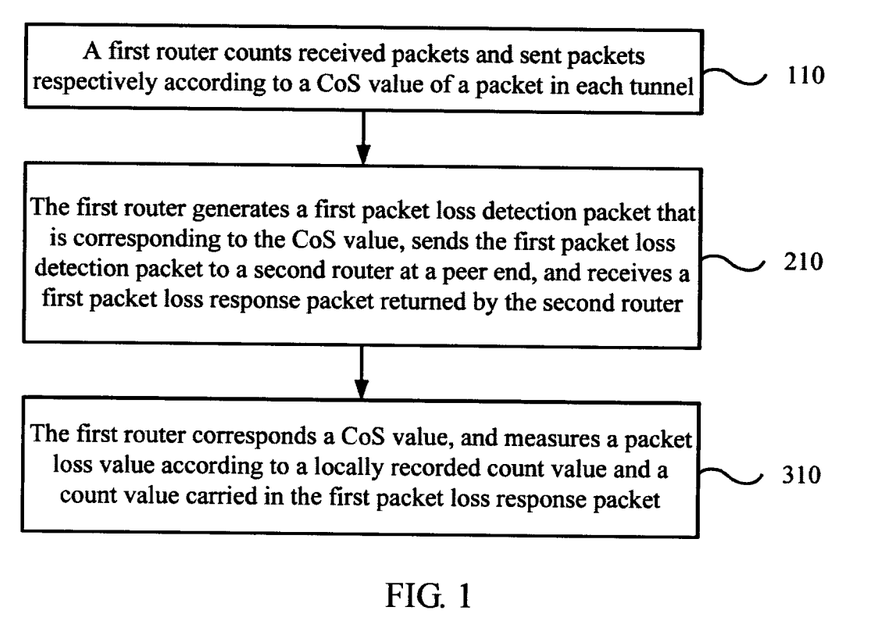
FIG. 1 is a flowchart of a packet loss detecting method provided in a first embodiment of the present disclosure.

FIG. 1 is a flowchart of a packet loss detecting method provided in a first embodiment of the present disclosure. The method includes the following steps:

Step 110: A first router counts received packets and sent packets respectively according to a CoS value of a packet in each tunnel;

Step 210: The first router generates a first packet loss detection packet corresponding to the CoS value, sends the first packet loss detection packet to a second router at a peer end, and receives a first packet loss response packet returned by the second router; and Step 310: The first router corresponds a CoS value, and measures a packet loss value according to a locally recorded count value and a count value carried in the first packet loss response packet.

This embodiment may be applied to packet loss detection in each PW in a VPLS or a VLL network architecture. A PW is a data carrier channel that carries multiple service flows. Each service flow may include multiple packets with the same CoS value. In the technical solution in this embodiment, a method for respectively counting service flow packets with different CoS values is adopted. The first packet loss detection packet and the first packet loss response packet also have corresponding CoS values. The first packet loss detection packet and the first packet loss response packet have the same CoS value as that of corresponding service flow packets. Therefore, no disorder phenomenon occurs.

Furthermore, each PW carries thousands of service flows. However, the number of CoS values is far smaller than the number of service flows. For example, currently, a CoS value is set to one of eight levels from 0 to 7. By adopting the technical solution in this embodiment, the first packet loss detection packet and the first packet loss response packet are sent according to each CoS value. The number of packet loss detection is limited, which does not occupy too much bandwidth resources.

At present, in most operators' networks, a multi protocol label switching (Multi Protocol Label Switching, referred to as MPLS) technology is adopted, so as to provide multiple flexible and reliable network connection modes for an individual user and an enterprise. A service flow packet carried in a PW is encapsulated by using an MPLS protocol packet, and the service flow packet does not need to know how the PW performs encapsulation. Each PW encapsulates a service flow packet carried by each PW into an MPLS protocol packet, and sets the same label (Label) for an MPLS protocol packet carried by each PW as a unique identifier of the PW. Because different users have different service transmission requirements, an "EXP" field is set in an MPLS protocol packet, when encapsulating an MPLS protocol packet, a PW maps a priority value in a service flow packet to a CoS value and sets the CoS value in the "EXP" field of the MPLS protocol packet. Compared with an MPLS protocol packet with a low priority, an MPLS protocol packet with a high priority is forwarded preferentially, so as to achieve an aim that different classes of service are provided for different users.

A VLAN packet is taken as an example. A VLAN packet originally has a 3-bit (bit) "Priority" identifier that identifies a CoS value of this service flow packet. The CoS value may be mapped to the "EXP" field of the MPLS protocol packet according to a preset mapping relationship. Then, whether to forward the MPLS protocol packet preferentially is controlled through a quality of service (Quality of Service, referred to as QoS) scheduling mechanism. Service flow packets of other types may map, according to the preset mapping relationship, information to a CoS value, where the information is similar to a priority, and set the CoS value in the MPLS protocol packet.

In the preceding step 110 in this embodiment, the step that the first router counts received packets and sent packets respectively according to the CoS value of the packet in each tunnel may specifically include:

Step 111: The first router identifies a label and a CoS value in a packet, where the label is used to identify a tunnel to which the packet belongs; and Step 121: The first router records the number of received packets with the same label and CoS value in a first received packet counter as a first received packet count value, and records the number of sent packets with the same label and CoS value in a first sent packet counter as a first sent packet count value.

In the preceding technical solution, a label is used to differentiate a tunnel and a CoS value is used to differentiate a packet, and packets with the same label and CoS value are taken as a detection case for counting, so that packet loss detection can be performed for packets with the same CoS value in each tunnel.

After the first router corresponds a CoS value and measures a packet loss value, the first router may further add each packet loss value obtained by measuring each CoS value corresponding to each tunnel, so as to obtain a total packet loss value in this tunnel.

Each router on a network may execute the technical solution in this embodiment. That is, the second router and the first router may execute a similar counting and packet loss detection solution.

Embodiment 2

Figure 2:
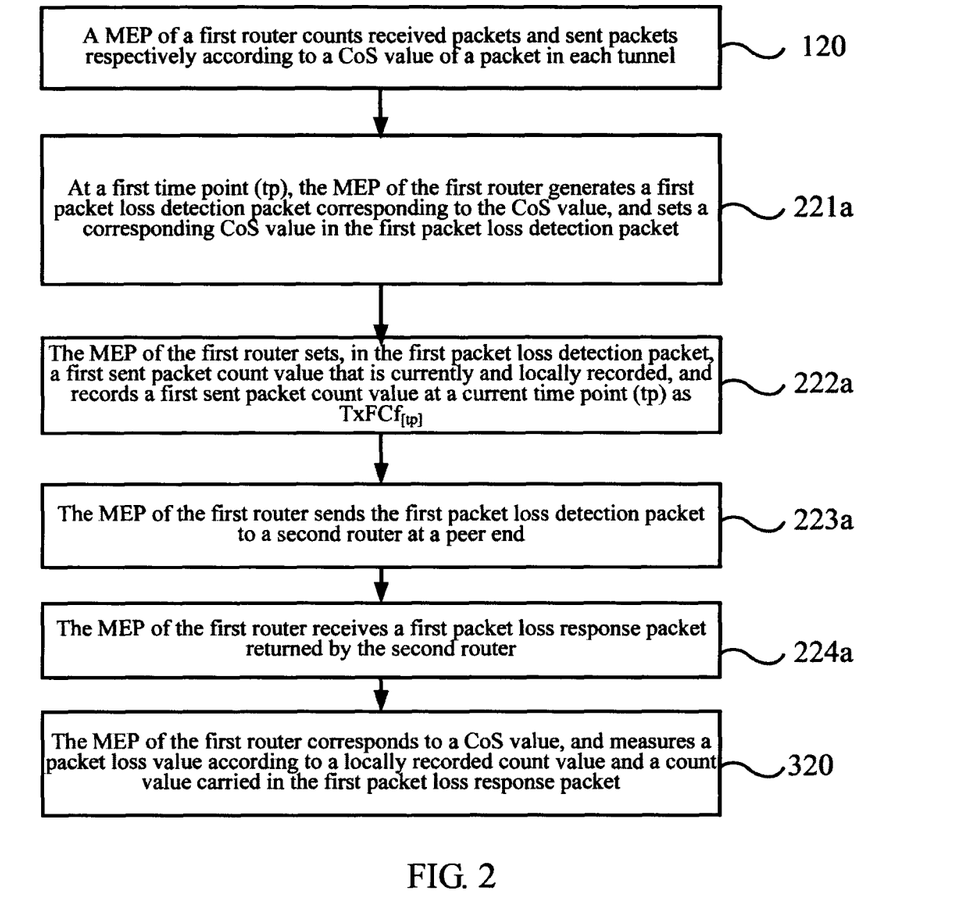
FIG. 2 is a flowchart of a packet loss detecting method provided in a second embodiment of the present disclosure.

FIG. 2 is a flowchart of a packet loss detecting method provided in a second embodiment of the present disclosure. The method in this embodiment is specifically a single-end packet loss detection mode, where packet loss detection is performed between a first router and a second router that are connected through a PW. Single-end packet loss detection refers to that: A router at a source end sends a packet loss detection packet to a router at a destination end, the router at the destination end returns a packet loss response packet, and after receiving the packet loss response packet, the router at the source end performs calculation according to traffic count carried in the packet loss response packet. Generally, in each router, a maintenance association end point (Maintenance association End Point, referred to as MEP) is established, and the MEP performs calculation and packet loss detection. The method includes the following steps:

Step 120: A MEP of a first router counts received packets and sent packets respectively according to a CoS value of a packet in each tunnel.

Specifically, the number of received packets with the same label and CoS value is recorded in a first received packet counter as a first received packet count value, RxFCl, and the number of sent packets with the same label and CoS value is recorded in a first sent packet counter as a first sent packet count value, TxFCf;

Step 221a: At a first time point (tp), the MEP of the first router generates a first packet loss detection packet corresponding to the CoS value, and sets a corresponding CoS value in the first packet loss detection packet.

In the single-end packet loss detection mode, the first packet loss detection packet may adopt a loss measurement message (Loss Measurement Message, referred to as LMM) packet, and a format of the LMM packet is shown in Table 1:

TABLE 1

| MEL | Version (0) | OpCode (LMM = 43) | Tag (0) | TLV Offset Value (12) |
|---|---|---|---|---|
| | | TxFCf | | |
| | | Reserved for RxFCf in LMR | | |
| | | Reserved for RxFCb in LMR | | |
| Terminating TLV (0) | | | | |

Step 222a: The MEP of the first router sets, in the first packet loss detection packet, a first sent packet count value that is currently and locally recorded, and records a first sent packet count value at a current time point (tp) as $TxFCf_{[tp]}$;

Step 223a: The MEP of the first router sends the first packet loss detection packet to a second router at a peer end;

Step 224a: The MEP of the first router receives a first packet loss response packet returned by the second router; and Step 320: The MEP of the first router corresponds to a CoS value, and measures a packet loss value according to a locally recorded count value and a count value carried in the first packet loss response packet, where a first received packet count value at a current time point (tp) locally recorded is recorded as $RxFCl_{[tp]}$.

After the preceding step 223a, an MEP in the second router at the peer end may execute the following steps to respond to packet loss detection. Counting received packets and sent packets in the second router is similar to that in the first router, which may specifically be: The number of received packets with the same label and CoS value is recorded in a second received packet counter as a second received packet count value, RxFCf, and the number of sent packets with the same label and CoS value is recorded in a second sent packet counter as a second sent packet count value, TxFCb. Response operations executed by the MEP of the second router are as follows:

Step 621a: The MEP of the second router receives an LMM packet sent by the first router;

Step 622a: The MEP of the second router converts a format of the LMM packet as a first packet loss response packet, and sets a local second received count value $RxFCf_{[tp]}$ at a current time point (tp) in the first packet loss response packet, where the first packet loss response packet may specifically adopt a loss measurement reply (Loss Measurement Reply, referred to as LMR) packet, and a format of the LMR packet is shown in Table 2;

TABLE 2

| MEL | Version | OpCode (LMR = 42) | Tag | TLV Offset Value |
|---|---|---|---|---|
| | | TxFCf | | |
| | | RxFCf | | |
| | | TxFCb | | |
| Terminating TLV (0) | | | | |

Step 623a: The MEP of the second router sets, in the LMR packet, a current second sent packet count value $TxFCb_{[tp]}$ locally recorded; and Step 624a: The MEP of the second router returns the LMR packet to the first router.

In the preceding step 320, the MEP of the first router obtains the first received packet count value $RxFCl_{[tp]}$ and the first sent packet count value $TxFCf_{[tp]}$ that are locally recorded, and the second received packet count value $RxFCf_{[tp]}$ and the second sent packet count value $TxFCb_{[tp]}$ that are returned by the second router. The preceding process is repeated to obtain four count values at a next time point (Tc), that is, $RxFCl_{[tc]}$, $TxFCf_{[tc]}$, $RxFCf_{[tc]}$, and $TxFCb_{[tc]}$. Packet loss may be measured for this CoS value according to the following formulas:

Remote-end frame loss, that is, a frame associated with an egress data frame is lost=$|TxFCf_{[tc]}-TxFCf_{[tp]}|-|RxFCf_{[tc]}-RxFCf_{[tp]}|$ Near-end frame loss, that is, a frame associated with an ingress data frame is lost=$|TxFCb_{[tc]}-TxFCb_{[tp]}|-|RxFCl_{[tc]}-RxFCl_{[tp]}|$ Packet loss values corresponding to other CoS values may be obtained by using the same method. Finally, a loss calculation result of each remote-end frame may be added to obtain a remote-end frame loss result of the PW. A loss calculation result of each near-end frame is added to obtain a near-end frame loss result of the PW.

Each router may periodically initiate packet loss detection. For the first router, the following operations may further be included:

receiving, by the first router, a second packet loss detection packet sent by the second router;

converting, by the first router, a format of the second packet loss detection packet as a second packet loss response packet, and setting a local current first received packet count value in the second packet loss response packet;

setting, by the first router, in the second packet loss response packet, a current first sent packet count value that is locally recorded; and returning, by the first router, the second packet loss response packet to the second router.

The second packet loss detection packet is a packet that is sent when the second router initiates packet loss detection, and sending of the second packet loss detection packet is similar to sending of the first packet loss detection packet by the first router. At this time, the first router, as a responder, returns the second packet loss response packet, and an operation is similar to an operation that the second router returns the first packet loss response packet.

Figure 3:
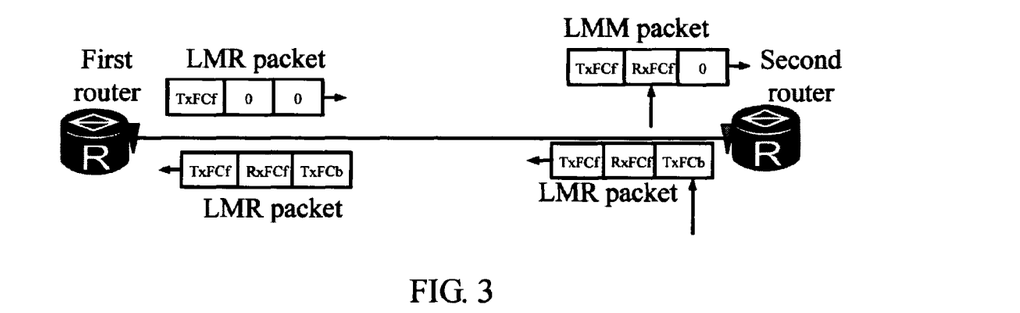
FIG. 3 is a schematic flowchart of a packet loss detecting method provided in the second embodiment of the present disclosure.

Based on the preceding technical solution, the single-end packet loss detection mode may be implemented. A schematic flowchart is as shown in FIG. 3. Accuracy of packet loss detection may be improved, and a smaller bandwidth is occupied.

Embodiment 3

Figure 4:
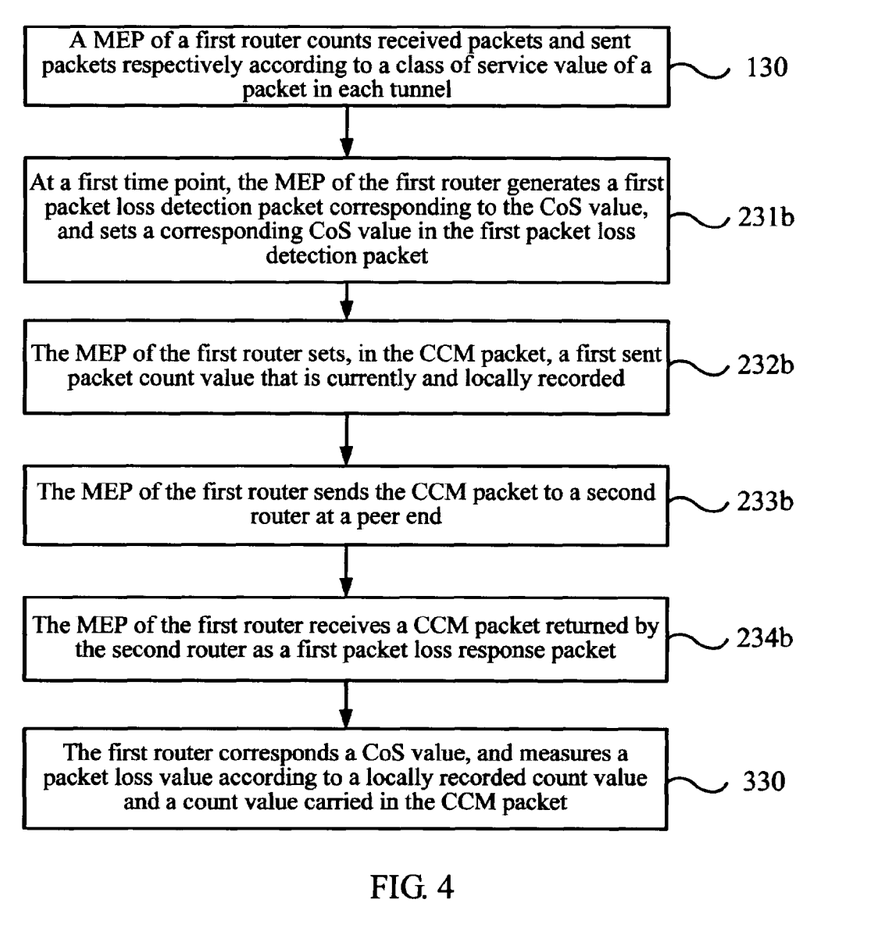
FIG. 4 is a flowchart of a packet loss detecting method provided in a third embodiment of the present disclosure.

FIG. 4 is a flowchart of a packet loss detecting method provided in a third embodiment of the present disclosure. The method in this embodiment is specifically a dual-end packet loss detection mode. The dual-end packet loss detection mode refers to that: Routers at both ends simultaneously send a packet loss detection packet that carries a sent packet count value and a received packet count value, where the packet loss detection packet may specifically be a continuity check message (Continuity Check Message, referred to as CCM) message, and a packet loss value may be calculated at both ends simultaneously. Similarly, the method in this embodiment may be executed by MEPs established in the routers, and includes the following steps:

Step 130: A MEP of a first router counts received packets and sent packets respectively according to a class of service value of a packet in each tunnel, and being similar to that in the second embodiment, may record a first received packet count value RxFCl and a first sent packet count value TxFCf;

Step 231b: At a first time point (tp), the MEP of the first router generates a first packet loss detection packet corresponding to the CoS value, and sets a corresponding CoS value in the first packet loss detection packet, where the first packet loss detection packet specifically adopts a CCM packet as shown in Table 3;

TABLE 3

| MEL | Version (0) | OpCode (CCM = 1) | Tag | TLV Offset Value (70) |
|---|---|---|---|---|
| | | Serial Number (0) | | |
| MEP ID | | | | |
| | | | | TxFCf |
| TxFCf | | | | RxFCb |
| RxFCb | | | | TxFCb |
| TxFCb | | | | Reserved (0) |
| Reserved (0) | | | | Terminating TLV (0) |

Step 232b: The MEP of the first router sets, in the CCM packet, a first sent packet count value that is currently and locally recorded, where the first sent packet count value at a current time point (tp) is recorded as $TxFCf_{[tp]}$;

Step 233b: The MEP of the first router sends the CCM packet to a second router at a peer end;

Step 234b: The MEP of the first router receives a first packet loss response packet returned by the second router, where the first packet loss response packet may also adopt a CCM packet; and Step 330: The first router corresponds to a CoS value, and measures a packet loss value according to a locally recorded count value and a count value carried in the CCM packet.

After the preceding step 233b, a MEP in the second router at the peer end may execute the following steps to respond to packet loss detection:

Step 631b: The MEP of the second router receives the CCM packet sent by the first router;

Step 632b: The MEP of the second router converts a format of the CCM packet as a first packet loss response packet, which may specifically be: copying $TxFCf_{[tp]}$ in the received CCM packet to a TxFcb field, and recording the $TxFCf_{[tp]}$ as $TxFcb_{[tp]}$, and sets a local second received packet count value $RxFCb_{[tp]}$ at a current time point (tp) in the CCM packet;

Step 633b: The MEP of the second router sets, in the CCM packet, a second sent packet count value $TxFCb_{[tp]}$ that is locally recorded at the current time point (tp); and Step 634b: The MEP of the second router returns the CCM packet to the first router.

In the preceding step 330, the MEP of the first router obtains the first received packet count value $RxFCl_{[tp]}$ and the first sent packet count value $TxFCf_{[tp]}$ that are locally recorded, and the second received packet count value $RxFCf_{[tp]}$ and the second sent packet count value $TxFCb_{[tp]}$ that are returned by the second router. The preceding process is repeated to obtain four count values at a next time point (Tc), that is, $RxFCl_{[tc]}$, $TxFCf_{[tc]}$, $RxFCf_{[tc]}$, and $TxFCb_{[tc]}$. Packet loss may be measured for this CoS value according to the following formulas:

Remote-end frame loss, that is, a frame associated with an egress data frame is lost=$|TxFCb_{[tc]}-TxFCb_{[tp]}|-|RxFCb_{[tc]}-RxFCb_{[tp]}|$ Near-end frame loss, that is, a frame associated with an ingress data frame is lost=$|TxFCf_{[tc]}-TxFCf_{[tp]}|-|RxFCl_{[tc]}-RxFCl_{[tp]}|$ Packet loss values corresponding to other CoS values may be obtained by using the same method. Finally, a loss calculation result of each remote-end frame may be added to obtain a remote-end frame loss result of the PW. A loss calculation result of each near-end frame is added to obtain a near-end frame loss result of the PW.

Figure 5:
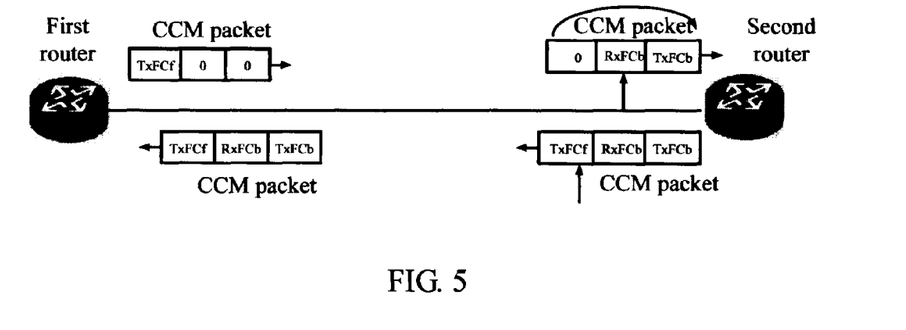
FIG. 5 is a schematic flowchart of a packet loss detecting method provided in the third embodiment of the present disclosure.

Based on the preceding technical solution, the dual-end packet loss detection mode may be implemented. A schematic flowchart is as shown in FIG. 5. Accuracy of packet loss detection may be improved, and a smaller bandwidth is occupied.

Embodiment 4

Figure 6:
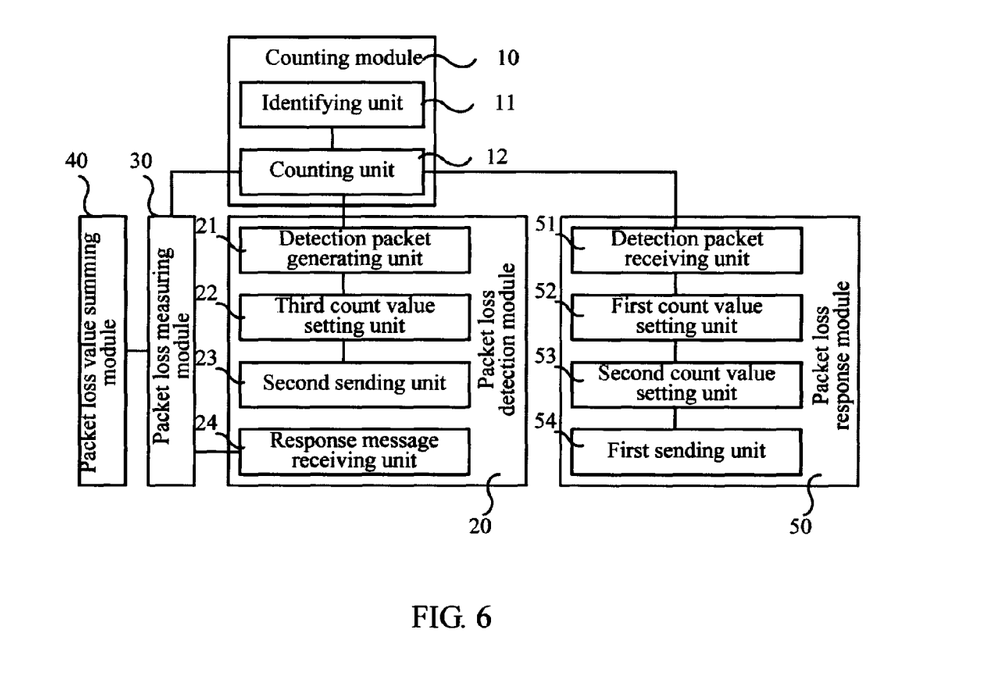
FIG. 6 is a schematic structural diagram of a packet loss detecting apparatus provided in a fourth embodiment of the present disclosure.

FIG. 6 is a schematic structural diagram of a packet loss detecting apparatus according to a fourth embodiment of the present disclosure. The packet loss detecting apparatus may specifically be a MEP established in a router. The apparatus includes a counting module 10, a packet loss detecting module 20, and a packet loss measuring module 30. The counting module 10 is configured to count received packets and sent packets respectively according to a class of service value of a packet in each tunnel; the packet loss detecting module 20 is configured to generate a first packet loss detection packet corresponding to the class of service value, sent the first packet loss detection packet to a second router at a peer end, and receive a first packet loss response packet returned by the second router; and the packet loss measuring module 30 is configured to correspond a class of service value, and measure a packet loss value according to a locally recorded count value and a count value carried in the first packet loss response packet.

With the technical solution in each embodiment of the present disclosure, taking only a PW as a detection object is extended to taking a PW and a CoS value as detection objects, which may solve a problem that packet disorder occurs when packet loss measurement is performed for a PW with multiple CoSs in a Y.1731 protocol, causing that a packet loss measurement result is not accurate. With the technical solutions in the embodiments of the present disclosure, packet loss detection is simultaneously performed on service flow packets that have the same CoS value in each PW. Measurement flows, the number of which is corresponding to the number of the CoS values, need to be deployed in a PW at most, so that packet loss detection for all traffic in the PW may be implemented by occupying only a small PW bandwidth. Therefore, the following advantages also exist: Traffic detection occupies a smaller bandwidth, the amount of configuration is low, and interconnection is not affected.

On the basis of the preceding technical solution, the counting module 10 may specifically include an identifying unit 11 and a counting unit 12. The identifying unit 11 is configured to identify a label and a class of service value in a packet, where the label is used to identify a tunnel to which the packet belongs; and the counting unit 12 is configured to record the number of received packets with the same label and class of service value in a first received packet counter as a first received packet count value, and record the number of sent packets with the same label and class of service value in a first sent packet counter as a first sent packet count value.

Furthermore, this apparatus may further include a packet loss value summing module 40, which is configured to add the packet loss values obtained by measuring each class of service value that is corresponding to each channel to obtain a packet loss value of the tunnel.

Based on the preceding counting method, this apparatus may implement a single-end packet loss detection mode and a dual-end packet loss detection mode. The packet loss detecting module 20 may specifically include a detection packet generating unit 21, a third count value setting unit 22, a second sending unit 23, and a response packet receiving unit 24. The detection packet generating unit 21 is configured to generate, at a first time point, a first packet loss detection packet corresponding to a class of service value, and set a corresponding class of service value in the first packet loss detection packet generated by the detection packet generating unit 21; the third count value setting unit 22 is configured to set, in the first packet loss detection packet generated by the detection packet generating unit 21, a first sent packet count value that is currently and locally recorded; the second sending unit 23 is configured to send the first packet loss detection packet generated by the detection packet generating unit 21 to a second router at a peer end; and the response packet receiving unit 24 is configured to receive a first packet loss response packet returned by the second router.

A packet loss detecting apparatus in each router may not only initiate packet loss detection, but also respond to packet loss detection packets that are received from other routers to generate a packet loss response packet at the same time. That is, each packet loss detecting apparatus may further include a packet loss responding module 50. The packet loss responding module 50 includes a detection packet receiving unit 51, a first count value setting unit 52, a second count value setting unit 53, and a first sending unit 54. The detection packet receiving unit 51 is configured to receive a second packet loss detection packet sent by a second router; the first count value setting unit 52 is configured to convert a format of the second packet loss detection packet as a second packet loss response packet, and set a local current first received packet count value in the second packet loss response packet; the second count value setting unit 53 is configured to set, in the second packet loss response packet, a first sent packet count value that is currently and locally recorded; and the first sending unit 54 is configured to return the second packet loss response packet to the second router.

An embodiment of the present disclosure further provides a router that includes the packet loss detecting apparatus provided in any one of the embodiments of the present disclosure. This router is interconnected, through a tunnel, with another router that includes the packet loss detecting apparatus provided in the embodiment of the present disclosure, and implements packet loss detection based on the packet loss detecting apparatus.

The packet loss detecting apparatus in each embodiment of the present disclosure may use the packet loss detecting method provided in the embodiments of the present disclosure, which may solve a problem that packet disorder occurs when packet loss measurement is performed for a PW with multiple CoSs in a Y.1731 protocol, causing that a packet loss measurement result is not accurate. In addition, only a small PW bandwidth is occupied.

It may be understood by those skilled in the art that all or a part of steps in the preceding method embodiments may be performed by a program instructing relevant hardware. The preceding program may be stored in a storage medium that can be read by a computer. When the program is executed, the steps in the preceding method embodiments are executed. The preceding storage medium may include any medium capable of storing program codes, such as a ROM, a RAM, a magnetic disk, or an optical disk.

Finally, it should be noted that the preceding embodiments are only used to describe the technical solutions of the present disclosure, but are not intended to limit the present disclosure. Although the present disclosure has been described in detail with reference to the preceding embodiments, it should be understood by those skilled in the art that modifications may still be made to the technical solution described in each preceding embodiment, or equivalent replacements may be made to a part of technical features of the technical solution, however, these modifications or replacements do not make the essence of a corresponding technical solution depart from the spirit and scope of the technical solution in each embodiment of the present disclosure.

What is claimed is:

1. A packet loss detecting method, comprising:
   generating, by a first router, at a first time point tp, a first packet loss detection packet corresponding to a class of service (CoS) value of a packet in a tunnel, wherein the CoS value is set in the first packet loss detection packet;
   recording a first sent packet count value at the first time point tp TxFCf[tp];
   sending the first packet loss detection packet to a second router at a peer end;
   receiving, by the first router, a first packet loss response packet returned by the second router, wherein the first packet loss response packet carries a second received packet count value RxFCf[tp];
   generating, by the first router, at a next time point tc, a second packet loss detection packet corresponding to the CoS value, wherein the CoS value is set in the second packet loss detection packet;
   recording the number of sent service flow packets as a third sent packet count value TxFCf[tc];
   sending the second packet loss detection packet to the second router at the peer end;
   receiving, by the first router, a second packet loss response packet returned by the second router, wherein the second packet loss response packet carries a fourth received packet count value RxFCf[tc]; and
   measuring, by the first router, a packet loss value corresponding to the CoS value, according to the following formula:

the packet loss value=|TxFCf[tc]−TxFCf[tp]|−|RxFCf[tc]−RxFCf[tp]|.

2. A packet loss detecting apparatus, comprising:
   a packet loss detecting module, configured:
      to generate a first packet loss detection packet corresponding to a class of service (CoS) value of a packet in a tunnel at a first time point tp, the CoS value being set in the first packet loss detection packet,
      to record a first sent packet count value at the first time point tp TxFCf[tp],
      to send the first packet loss detection packet to a second router at a peer end,
      to receive a first packet loss response packet returned by the second router,
      wherein the first packet loss response packet carries a second received packet count value RxFCf[tp];
      to generate a second packet loss detection packet corresponding to the CoS value at a next time point tc, the CoS value being set in the second packet loss detection packet,
      to record a third sent packet count value TxFCf[tc],
      to send the second packet loss detection packet to the second router at the peer end, and
      to receive a second packet loss response packet returned by the second router, wherein the second packet loss response packet carries a fourth received packet count value RxFCf[tc]; and
   a packet loss measuring module, configured to measure a packet loss value corresponding to the CoS value, according to the following formula:

the packet loss value=|TxFCf[tc]−TxFCf[tp]|−|RxFCf[tc]−RxFCf[tp]|.

3. The packet loss detecting apparatus according to claim 2 wherein, the packet loss detecting module comprises:
   a detection packet generating unit, configured to generate the first packet loss detection packet corresponding to the CoS value of the packet in the tunnel at the first time point tp, the CoS value being set in the first packet loss detection packet, generate the second packet loss detection packet corresponding to the CoS value at the next time point tc, the CoS value being set in the second packet loss detection packet;
   a count value setting unit, configured to record the first sent packet count value TxFCf[tp] and to record the third sent packet count value TxFCf[tc];
   a sending unit, configured to send the first packet loss detection packet to the second router at the peer end, and to send the second packet loss detection packet to the second router at the peer end; and
   a response packet receiving unit, configured to receive the first packet loss response packet returned by the second router, wherein the first packet loss response packet carries the second received packet count value RxFCf[tp], and to receive the second packet loss response packet returned by the second router, wherein the second packet loss response packet carries the fourth received packet count value RxFCf[tc].

* * * * *